(12) United States Patent
Barth

(10) Patent No.: US 9,736,897 B2
(45) Date of Patent: Aug. 15, 2017

(54) DIMMABLE LED ILLUMINANT SYSTEM

(71) Applicant: Tridonic GmbH & Co KG, Dornbirn (AT)

(72) Inventor: Alexander Barth, Alberschwende (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 14/909,890

(22) PCT Filed: Jul. 31, 2014

(86) PCT No.: PCT/EP2014/066496
§ 371 (c)(1),
(2) Date: Feb. 3, 2016

(87) PCT Pub. No.: WO2015/018735
PCT Pub. Date: Feb. 12, 2015

(65) Prior Publication Data
US 2016/0183335 A1     Jun. 23, 2016

(30) Foreign Application Priority Data

Aug. 5, 2013     (DE) .......................... 10 2013 215 334

(51) Int. Cl.
*H05B 37/02*     (2006.01)
*H05B 33/08*     (2006.01)
(52) U.S. Cl.
CPC ....... *H05B 33/083* (2013.01); *H05B 33/0809* (2013.01); *H05B 33/0827* (2013.01); *H05B 33/0845* (2013.01); *H05B 37/0263* (2013.01); *Y02B 20/383* (2013.01)

(58) Field of Classification Search
CPC .............. H05B 37/029; H05B 33/0803; H05B 37/0254; H05B 37/02; H05B 33/0818
USPC .......................... 315/291, 307, 312, 224, 246
See application file for complete search history.

(56) References Cited

U.S. PATENT DOCUMENTS

| 6,396,466 B1 | 5/2002 | Pross et al. | |
| 2004/0095078 A1* | 5/2004 | Leong | F21K 9/00 315/291 |
| 2006/0109219 A1* | 5/2006 | Robinson | G09G 3/14 345/83 |
| 2006/0145636 A1* | 7/2006 | Bacon | H05B 33/0812 315/312 |

(Continued)

OTHER PUBLICATIONS

International Search Report and Written Opinion issued in connection with the corresponding International Application No. PCT/EP2014/066496 on Feb. 11, 2015.

*Primary Examiner* — Minh D A
(74) *Attorney, Agent, or Firm* — The H.T. Than Law Group

(57) ABSTRACT

A dimmable LED illuminant system is provided, comprising at least two LED illuminant chains connected in parallel and/or back-to-back and having in each case at least one light emitting diode, wherein the LED illuminant system has a control unit and is fed via a supply, which is designed to receive dimming information supplied via the supply and to switch on and/or off in stages individual ones of the LED illuminant chains connected in parallel/back-to-back depending on the supplied dimming information and for the implementation thereof.

14 Claims, 6 Drawing Sheets

(56) References Cited

U.S. PATENT DOCUMENTS

| | | | |
|---|---|---|---|
| 2010/0231135 A1* | 9/2010 | Hum | H05B 33/0815 |
| | | | 315/250 |
| 2011/0227489 A1 | 9/2011 | Huynh | |
| 2011/0248640 A1 | 10/2011 | Welten | |
| 2013/0015774 A1* | 1/2013 | Briggs | H05B 33/0815 |
| | | | 315/186 |
| 2013/0050697 A1* | 2/2013 | Colbourne | G01J 3/0205 |
| | | | 356/328 |

* cited by examiner a)

b)

DIMMABLE LED ILLUMINANT SYSTEM

FIELD OF THE INVENTION

The invention relates to a dimmable LED illuminant system. This dimmable LED illuminant system comprises at least two parallel and/or back-to-back configured LED illuminant chains and a control unit. In particular, the LED illuminant chains are embodied as LED chains and each LED illuminant chain comprises at least one light emitting diode, that is, one LED, as illuminant. The invention relates further to a method for operating an LED illuminant system, an LED lamp comprising an LED illuminant system according to the invention, and a retrofit lamp comprising an LED illuminant system according to the invention. In this context, a light emitting diode (LED) should be understood to include both inorganic and also organic light emitting diodes.

SUMMARY OF THE INVENTION

In particular, "LED lamps" are to be understood as LED lamps which use one or more LEDs as illuminant but comprise a housing and preferably an optic and comprise means for the mechanical and electrical connection of the LED lamp and an electronic circuit for feeding the LED.

In particular, "retrofit lamps" are to be understood as retrofit LED lamps which use one or more LEDs as illuminant but are embodied for the mechanical and electrical connection in such a manner that they can be used as a replacement for other illuminants, such as incandescent lamps or halogen lamps.

Retrofit lamps are equipped with screw fittings, bayonet fittings or plug-in fittings which are appropriate for the sockets developed for incandescent lamps or halogen lamps. However, this mechanical matching alone is not yet sufficient for the replacement. On the one hand, because of the different methods of operation of incandescent lamps (which process AC-voltage half waves with both polarities) and, on the other hand, light emitting diodes (which are active only in the case of AC-voltage half waves of a given polarity), additional matching measures are still required. These also relate, in particular, to the type of dimming.

One disadvantage in devices in which several identical LED chains are operated directly in parallel configuration with an AC-voltage is that, with regard to their brightness, the LED chains change in brightness synchronously with the AC-voltage and track the characteristic of the AC-voltage synchronously with a brightness modulation. To prevent an LED system from behaving synchronously in brightness with the connected AC-voltage, a given number of LEDs are selectively added or respectively switched off synchronously with the characteristic of the AC-voltage for each of the parallel LED chains.

However, this means that a brightness modulation of the circuit presented occurs, for example, at 100 Hertz, which can be disturbing for the human eye, because this modulation is still perceived. Furthermore, with the configuration according to the prior art, no dimming is possible.

Now the object of the invention is to deliver a dimming technique which overcomes the disadvantages of the prior art. For this purpose, the invention delivers a dimmable LED illuminant system, a dimming method, an LED lamp and a retrofit lamp according to the independent claims. Further developments of the invention form the subject matter of the dependent claims.

In one aspect, a dimmable LED illuminant system is delivered with at least two parallel and/or back-to-back configured LED illuminant chains comprising respectively at least one light emitting diode, wherein the LED illuminant system is fed via a supply and comprises a control unit which is equipped to receive a dimming information supplied via the supply and to switch on and/or to switch off individual parallel/back-to-back configured LED illuminant chains in stages dependent upon the supplied dimming information and for the implementation thereof.

At least one light emitting diode of the LED illuminant system can be capable of bridging by at least one switching element provided parallel to it and switchable by the control unit. The control unit can activate or deactivate the switching elements, in particular, dependent upon an electrical supply of the LED illuminant system.

The electrical supply of the LED illuminant system can be an AC-voltage or a DC-voltage.

The LED illuminant system can comprise illuminant chains configured back-to-back and can be operated directly starting from an AC-voltage. The LED illuminant system can comprise LED illuminant chains configured in parallel and can be operated directly starting from a DC-voltage. The LED illuminant system can comprise illuminant chains configured in parallel, upstream of which a rectifier is connected, and can be operated directly starting from an AC-voltage.

Dependent upon the electrical supply of the LED illuminant system, the control unit can switch on or respectively switch off individual light emitting diodes in the LED illuminant chains by activating or respectively deactivating the switching elements, and, in particular, light emitting diodes which substantially share one coordinate in their spatial orientation in different LED illuminant chains.

A converter can convert an AC-voltage into a DC-voltage and deliver the DC-voltage as an electrical supply to the LED illuminant system.

The converter can vary an electrical supply supplied to the LED illuminant system dependent upon a dimming information. The converter can be, for example, a flyback converter (isolated blocking converter), a step-down converter (buck converter) or an isolated half-bridge converter.

The control unit can evaluate a signal transmitted by means of the supply voltage, for example, a phase-control signal/reverse phase-control signal and/or a selective half-wave rectification in order to detect the dimming information.

The control unit can detect the dimming information by evaluating the electrical supply of the LED illuminant system, in particular, a variation in the electrical supply (for example, the supply voltage).

The electrical supply can be a DC-voltage output from a converter. The dimming information can be an amplitude/amplitude-change of the electrical supply.

The LED illuminant system can comprise a rectifier and/or the drive converter.

The light emitting diodes and the switching elements for the bridging can be arranged in a matrix structure, wherein at least one light emitting diode in each LED illuminant row can be bridged, and at least one switching element switchable by the control unit, which is equipped to switch on or to switch off the respective LED illuminant chain, is provided in each LED illuminant chain.

The illuminant chains can be LED illuminant chains and the illuminants can be LEDs.

In a further aspect, an LED lamp is provided, comprising an LED illuminant system according to any one of the preceding claims.

In a further aspect, a retrofit lamp is provided, comprising an LED illuminant system according to any one of the preceding claims.

In yet another aspect, a method is provided for the control of a dimmable LED illuminant system with at least two parallel and/or back-to-back configured LED illuminant chains comprising respectively at least one light emitting diode (LED), wherein the LED illuminant system is fed via a supply, wherein a control unit of the LED illuminant system detects a dimming information supplied via the supply and switches on and/or switches off individual parallel/back-to-back configured LED illuminant chains in stages dependent upon the detected dimming information and for the implementation thereof.

BRIEF DESCRIPTION OF THE DRAWINGS

The invention will now also be described with reference to the Figs. The Figs. show.

DETAILED DESCRIPTION OF THE PREFERRED EMBODIMENTS

Figure 1:
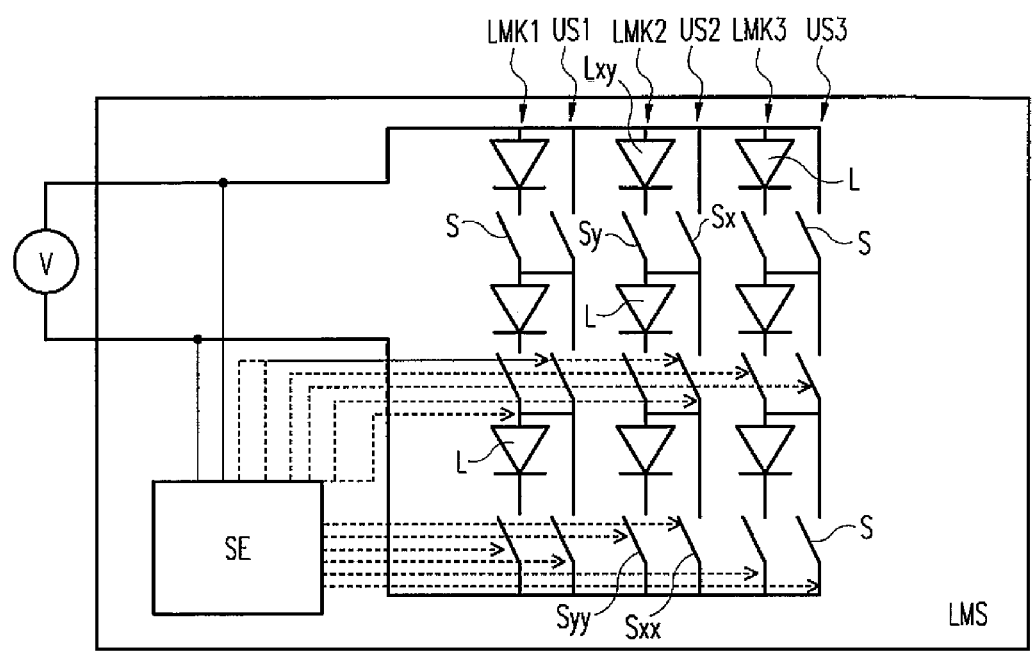
FIG. 1 schematically an LED illuminant system.

According to the invent on, it is provided that a dimming information of a control unit is supplied to an input via the supply. By contrast with the prior art, the control unit now switches off not only individual LEDs in an LED illuminant chain or respectively LED chain, but, in particular, can also implement a dimming in stages by selectively adding or switching off complete LED illuminant chains.

For lighting systems with traditional incandescent lamps, phase-control dimmers have become widely established. This is, in particular, because they operate in a largely lossless manner. However, the latter does not apply for operation with LEDs. In order to limit the power losses, a considerable additional circuit effort is required. Added to this is the fact that—also in the case of an operation with incandescent lamps—phase-control dimmers necessarily irradiate undesired harmonics into the power-supply system. However, a largely sinusoidal current consumption is expected from modern modules. This can be achieved through the additional installation of actively clocked PFCs (power factor correction circuits).

A signal transmission through to an electrical consumer supplied with AC-voltage, in particular, an LED lamp or retrofit lamp, can be implemented in that at least the signal conditions "presence of a phase-control signal/reverse phase-control signal" and "absence of a phase-control signal/reverse phase-control signal" or "rectified AC-voltage" and "non-rectified, that is bipolar, AC-voltage" are present. Starting from these two logical conditions, analog or digital signal protocols of arbitrary complexity can be implemented. For example, an evaluation by a control unit of the duration and/or a repetition rate of the respective logical condition is analog. For a digital signal transmission, the two named physical conditions can be used as logical "1" and "0".

This protocol can be addressed or unaddressed. In the case of an addressing, data or signals can be part of the protocol.

In principle, the named communications technology through selective phase-control/reverse phase-control or selective rectification does not preclude the presence of further logical conditions on the AC-power-supply line in addition to the two named conditions. These can be, for example, a PLC modulation (power line carrier, high-frequency modulation preferably with low amplitude) or a temporary suppression of the AC-voltage.

Reverse phase-control or phase-control can also be implemented in combination with the selective rectification, and further possible combinations, such as an additional amplitude modulation, are possible.

Furthermore, the possibility of providing a further wireless medium (for example, radio, optical, IR, . . . ) or tethered medium (for example, digital and/or analog bus) in addition to the named signal transmission is not precluded in principle.

By preference, a signal transmission towards the control device 5 is therefore implemented through selective phase-control/reverse phase-control or selective rectification of the AC-supply voltage. Should a return channel be present, this can be implemented through an arbitrary signaling of another kind (see the examples above). Reference is made here to document DE 10 2011 089 833 A1, and especially to FIGS. 1a, 1b and 2 with the associated description. In that context, the method of functioning of the signal transmission by selective rectification is described in various embodiments.

In particular, the light emitting diodes (as the illuminant of the LED illuminant chains, that is, the LEDs of the LED chains) are arranged in a matrix arrangement, and a given number of the light emitting diodes can be bridged by switching elements provided in parallel to the light emitting diodes. In particular, one switching element can be provided for each light emitting diode.

The dimming information, which preferably reproduces a dimming value, can be determined by the control unit by evaluating the electrical supply supplied to the LED illuminant system, that is, in particular, the supply supplied to the LED illuminant system. In particular, the control unit can evaluate, for example, a selective phase-control/reverse phase-control or selective rectification of the power-supply voltage and then selectively switch on and/or switch off individual ones, several or all of the illuminant strings by activation/deactivation of the switching elements provided. The switching of the switching element into the conducting condition is understood here as an activation of a switching element.

If an operation of the LED illuminant system is to be implemented directly in an AC-current/AC-voltage supply, a rectifier can be connected upstream of the LED illuminant system, which converts the AC-voltage into a DC-voltage. The rectifier can be embodied as a full-wave rectifier or as a half-wave rectifier. However, it can also be provided that the illuminant chains are switched in an anti-parallel or back-to-back manner, so that the LED illuminant system can be supplied directly, starting from an AC-voltage and accordingly, a corresponding operation of the LED illuminant system can also be implemented in the case of an AC-voltage supply. By preference, for every LED illuminant chain, an LED illuminant chain connected back-to-back to it is present, so that pairs of the LED illuminant chains are present in each case. As a result of the back-to-back arrangement of the LED illuminants, that is, of the LEDs, at least a part of the LED illuminant chains is active for each half wave of the AC-voltage supply.

The control unit detects a dimming information (a dimming signal) or respectively determines this from the power-supply voltage supplied to it and activates/deactivates the LED illuminant chains of the LED illuminant system in stages.

In particular, this addition and switching off through switching elements/bridges, or respectively by switching off/addition of the power-supply paths to the LED illuminant chains, is implemented by means of the switching elements. Dependent on the electrical supply of the dimmable LED illuminant system supplied by the control unit or determined by it, the control unit can now add or switch off individual light emitting diodes in the LED illuminant chains through activation/deactivation of one or more corresponding switching elements. This can be implemented selectively.

Dependent upon the dimming information supplied, one or more LED illuminant chains are deactivated or activated by the control unit.

With an arrangement of the LED illuminant chains or respectively light emitting diodes in a matrix structure, the control unit can activate/deactivate individual light emitting diodes in the LED illuminant chains dependent upon the voltage detected, in particular, in the case of a supply of the LED illuminant system starting from an AC-voltage. Accordingly, light emitting diodes substantially along one axis of the matrix, for example, light emitting diodes substantially in one LED illuminant row, can be deactivated or activated.

The preferably corresponding light emitting diodes therefore substantially comprise one identical coordinate in their spatial orientation, or respectively an identical coordinate ratio (for example, in the case of diagonals).

Dependent upon the amplitude of the supply which is detected by the control unit, one or more LED illuminant rows can therefore be deactivated or activated by the control unit.

In order to prevent a ripple, for example, at 100 Hz, which causes a fluctuation/modulation of the intensity/brightness emitted by the LED illuminant system, a converter, in particular, an AC/DC converter (AC=AC-voltage/AC current, DC=DC-voltage/DC current; the converter is a converter for the conversion of AC-voltage/AC current into DC-voltage/DC current) can be connected upstream of the LED illuminant system, so that the LED illuminant chains of the LED illuminant system are operated not with AC-current, but, in particular, with DC-current. The brightness modulation of the LED illuminant system can be reduced in this manner.

The AC/DC converter used can also be equipped to evaluate a dimming control signal. This can be, for example, a digital bus signal which is supplied via a tethered or wireless bus, a phase-control signal, a reverse phase-control signal or a dimming control signal which is obtained from the evaluation of the supply-voltage half waves supplied to the converter.

Accordingly, with the use of the AC/DC converter, the control of the LED illuminant system is implemented with DC-voltage. A data information detected and evaluated by the AC/DC converter can now be evaluated by the control unit in such a manner that individual switching elements provided in the LED illuminant system are switched, so that the detected dimming information can be implemented preferably for the selective, complete switching on and switching off of individual ones/several/all of the LED illuminant chains.

In the presence of the AC/DC converter, the dimming information which preferably reproduces a dimming value can be determined by the control unit by evaluating the electrical supply supplied by the AC/DC converter to the LED illuminant system, that is, in particular, the power-supply voltage supplied by the AC/DC converter to the LED illuminant system.

In particular, in the presence of an AC/DC converter, the control unit can also evaluate, for example, an amplitude of the power-supply voltage and, following that, can selectively switch on and/or switch off individual ones, several or all illuminant strings through activation/deactivation of the switching elements provided.

In the presence of an AC/DC converter, the power-supply voltage evaluated by the control unit can be a DC-voltage output by the AC/DC converter.

FIG. 1 shows an LED illuminant system LMS according to the invention by way of example.

LED illuminant chains LMK1, LMK2, LMK3 are operated starting from an electrical supply V. In the illustrated scheme, the LED illuminant chains LMK1, LMK2, LMK3 are configured in parallel and each provide LED illuminant L (that is, a light emitting diode or respectively LED). Switching elements S are configured in series and in parallel with the light emitting diodes L. Now, on the one hand, the switching elements S in parallel with the light emitting diodes L serve to bridge and therefore to deactivate individual light emitting diodes L, while the switching elements S configured in series with the light emitting diodes L can serve to decouple light emitting diodes L from the respective LED illuminant chain, or respectively to interrupt the power-supply path to an LED illuminant chain and accordingly to deactivate the LED illuminant chain. For example, the bridging switching elements in FIG. 1 parallel with the second LED illuminant chain LMK2 are designated with US2. By analogy, US1 designates the bridging switching elements of a first LED illuminant chain LMK1, and US3 designates the bridging switching elements of a third LED illuminant chain LMK3. For example, individual light emitting diodes L can be bridged and therefore deactivated by the switching elements S parallel with the light emitting diodes L, and, in this manner, an LED illuminant row (that is, light emitting diodes arranged on the same level, quasi parallel) can be bridged and thereby deactivated. However, as an alternative to an LED illuminant row, an LED illuminant diagonal can, for example, also be bridged and therefore deactivated. With such a bridging and therefore deactivation for every active LED illuminant chain, one light emitting diode respectively or an identical number of light emitting diodes can always be bridged and therefore deactivated.

Furthermore, a control unit SE is provided, for example, an integrated circuit IC, an ASIC and/or a microcontroller, which is equipped to deactivate and/or to activate the switching elements S of the LED illuminant system LMS, that is, to switch into a non-conducting state or respectively off and/or into a conducting stake or respectively on. The control by the control unit SE is indicated by way of example by the dashed arrows in FIG. 1.

Furthermore, the control unit SE is connected directly or indirectly to the electrical supply V. In this manner, on the one hand, the control unit SE can be supplied with electricity; on the other hand, the control unit SE can evaluate the electrical supply and, on the basis of a result of this evaluation, can switch on and/or switch off at least one, preferably several of the switching elements S. Accordingly, for example, by switching off a switching element Sx and by switching on a switching element Sy, a light emitting diode Lxy can be deactivated. If all of the switching elements S connected in series to the light emitting diode Lxy are activated, that is, switched on, and only the switching element Sy is deactivated, that is switched off, and if further, at least one of the bridging switching elements US2 is deactivated. Then the entire second LED illuminant chain LMK2 is deactivated. However, by preference, the switching off of the second LED illuminant chain LMK2 is implemented by deactivating the switching elements Syy and Sxx, as illustrated in FIG. 1. By preference, the LED illuminant system LMS provides at its input a rectifier, which is not illustrated in FIG. 1. The rectifier can be embodied as a full-wave rectifier or as a half-wave rectifier.

The rectifier can be arranged directly at the input of the LED illuminant system LMS or after the connection of the control unit SE to the electrical supply V.

It should be understood that the control of the other switching elements of the first and third LED illuminant chain LMK1, LMK3 and/or of the associated bridging switching elements US1, US3 can be implemented in an analogous manner.

With an appropriate arrangement of the switching elements S, it is possible in principle to generate every combination of deactivated/activated light emitting diodes L. It is especially possible to completely deactivate each of the LED illuminant chains LMK1, LMK2, LMK3.

Figure 2:
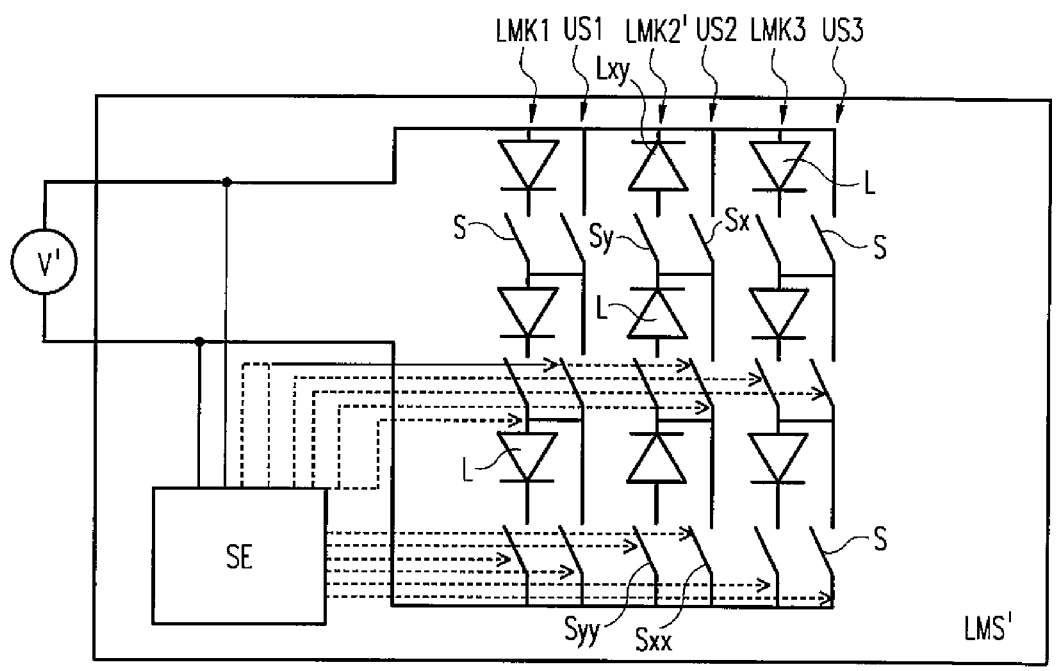
FIG. 2 schematically a further LED illuminant system.

Now, FIG. 2 shows by way of example an LED illuminant system LMS' which offers substantially the same functionality as the illuminant system LMS shown in FIG. 1. The reference numbers are therefore identical to those from FIG. 1. Only a second LED illuminant chain LMK2' is now configured back-to-back with the first LED illuminant chain LMK1 and with the third LED illuminant chain LMK3. To simplify the presentation, an unsymmetrical number of back-to-back LED illuminant chains is illustrated here, by preference, a symmetrical number of back-to-back LED illuminant chains is selected. An electrical supply V' of the LED illuminant system LMS' is selected to be different from the electrical supply V of the LED illuminant system LMS.

For example, the electrical supply V can be a supply with DC-voltage/current, while the electrical supply V' can be a supply with AC-voltage/current.

Figure 3:
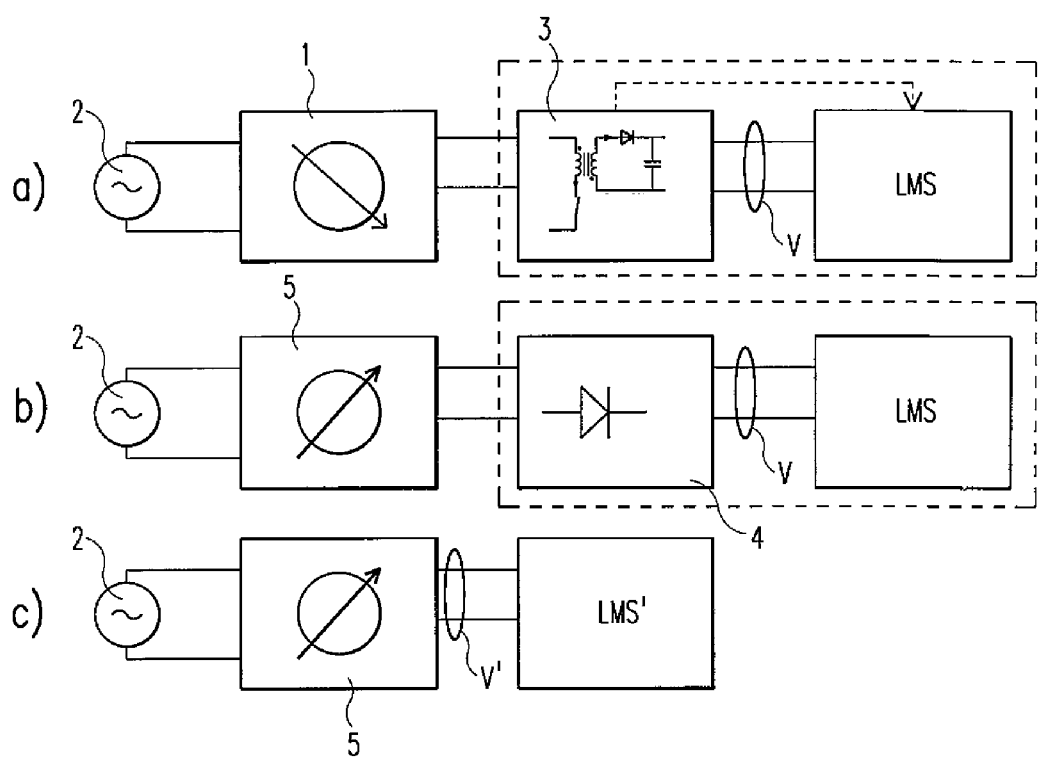
FIG. 3a)-c) schematically circuit arrangements with the LED illuminant systems from FIG. 1 and FIG. 2.

FIGS. 3a-c now show, by way of example and schematically, a possible use of the LED illuminant systems LMS, LMS' from FIGS. 1 and 2.

FIGS. 3a-c show applications in which a dimmer 1 is fed starting from a mains supply 2. The dimmer 1 can, in particular, be a Triac or respectively a phase-control dimmer/reverse phase-control dimmer. Alternatively, a dimming control signal can also be supplied via a digital bus, or a dimming circuit which performs a selective rectification can be used, as described in DE 10 2011 089 833 A1.

The dimmer 1 acts on the electrical supply V, V' of the LED illuminant system LMS, LMS' and varies the latter dependent upon a dimming value adjusted in the dimmer. This dimming value indicates how the power of the LED illuminant system LMS, LMS' should be varied. In this context, an increase of the dimming value should usually bring about an increase in the luminous power emitted, wherein, for example, a dimming value of 100% indicates that the LED illuminant system LMS, LMS' is to be operated with full power/brightness. By contrast, a reduction of the dimming value, normally leads to a reduction in the luminous power or respectively the brightness.

In FIGS. 3a and 3b, an additional component is arranged in each case between the dimmer 1 and the LED illuminant system LMS.

In the case of FIG. 3a, this is a converter 3, in particular, an AC/DC converter, which, on the one hand, can implement a rectification of the electrical supply delivered by the dimmer 1 and, on the other hand, can adjust an output power and accordingly the electrical supply V of the LED illuminant system LMS dependent upon an adjusted dimming value, that is, in particular, dependent upon the power delivered by the dimmer 1.

In this context, the converter 3 can evaluate the electrical supply supplied to it by the dimmer 1 and determine a dimming information reproducing the dimming value adjusted in the dimmer 1. For this purpose, the converter can comprise a corresponding evaluation circuit (IC, ASIC, microcontroller, . . . ). Through modulation of the electrical supply V, the converter 3 can communicate this dimming information to the control unit SE (not illustrated here) of the LED illuminant system LMS or also, additionally, via a separate pathway (dashed-line arrow), for example, for special data.

As described above, in order to detect dimming information and control the switching elements S accordingly, the control unit SE of the LED illuminant system LMS can therefore evaluate the electrical supply V, preferably without an additional information channel, such as an additional data line.

The converter 3 and the LED illuminant system LMS are preferably provided as separate components or respectively modules. The dashed-line border around these components indicates that the converter 3 and the LED illuminant system LMS can be embodied, in an optional variant, as integrated component/integrated module. In this example of FIG. 3a, the converter 3 assumes the function of the control device 5 because it outputs a dimming information with the supply.

In FIG. 3b, a control device 5 which transmits a dimming information to the supply is shown. The supply with the dimming information is supplied to a rectifier 4 so that a rectification is in fact implemented, but this supply still contains the dimming information. The control unit SE evaluates the electrical supply V in order to detect the dimming information. This example of FIG. 3b is particularly suitable for the transmission of a selective phase-control/reverse phase-control as dimming information from the control device 5 to the LED illuminant system LMS.

In FIG. 3c, a direct operation of the LED illuminant system LMS' in the control device 5 is now shown, wherein here, an AC-voltage is present as the electrical supply V'. The LED illuminant system LMS' therefore corresponds substantially with that of FIG. 2, or, as explained in example 1, a rectifier is integrated at the input of the LED illuminant system LMS.

Figure 4:
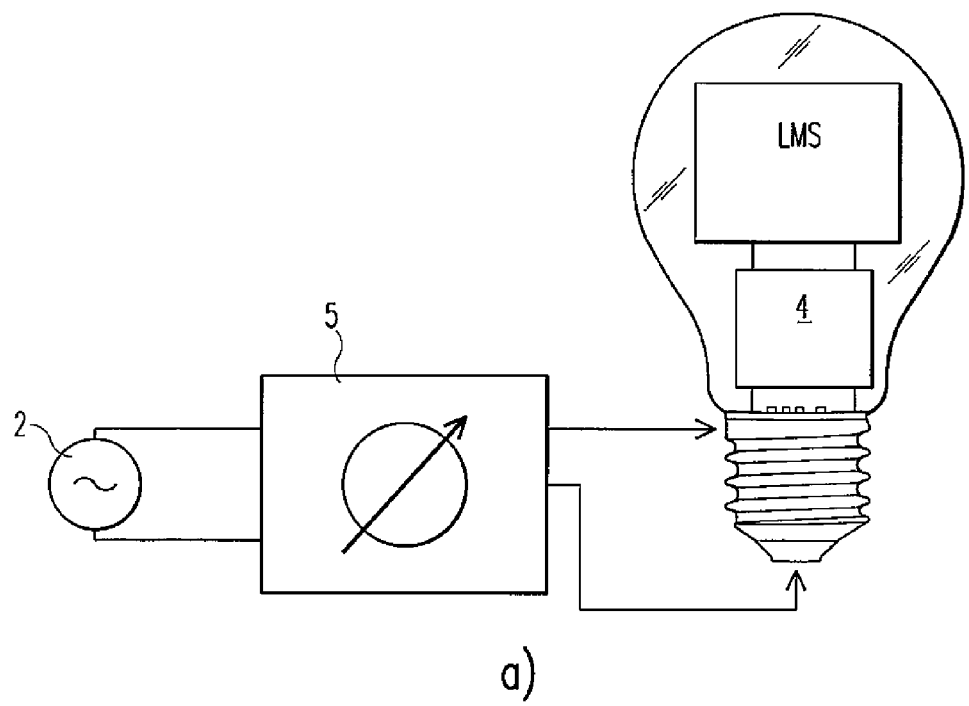
FIG. 4a) schematically a retrofit lamp with the LED illuminant system from FIG. 1.
FIG. 4b) schematically a retrofit lamp with the LED illuminant system from FIG. 2.
Figure 4:
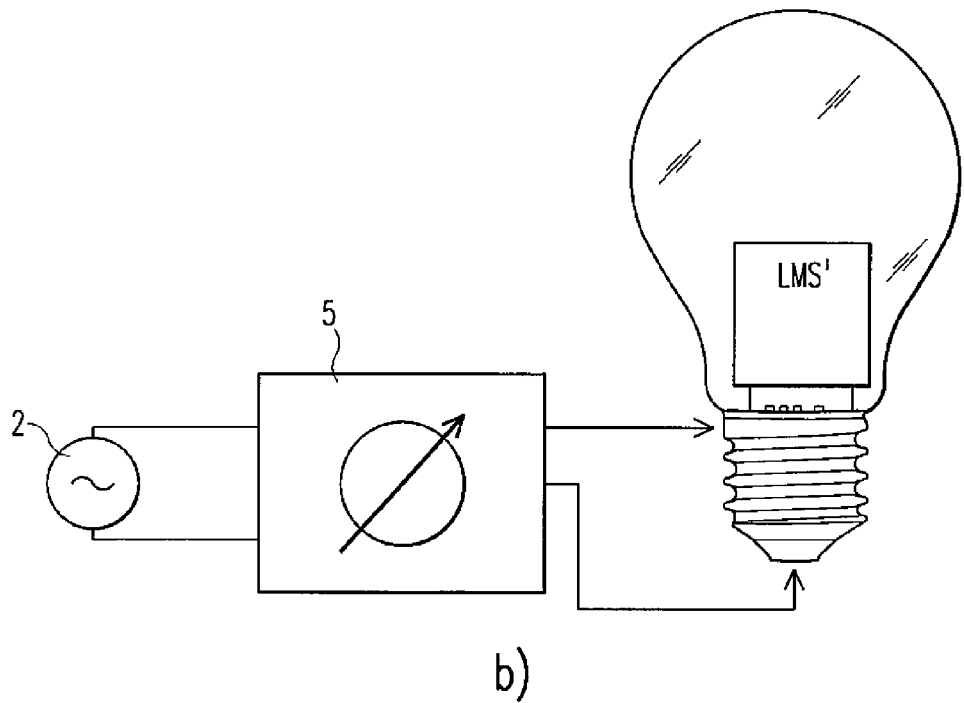

FIG. 4a now shows a use of the arrangements from FIGS. 3a and 3b, in each case in a retrofit lamp. In this context, the rectifier 4 is illustrated in a component 4, wherein this is supposed to indicate that the rectifier 4 can be arranged upstream of the LED illuminant system LMS.

As an alternative to the retrofit lamp, the examples described in the following can also be used for an LED lamp.

FIG. 4b shows a use of the arrangement from FIG. 3c, in which either the LED illuminant chains are arranged back-to-back, or a rectifier is integrated directly into the LED illuminant system.

Figure 5:
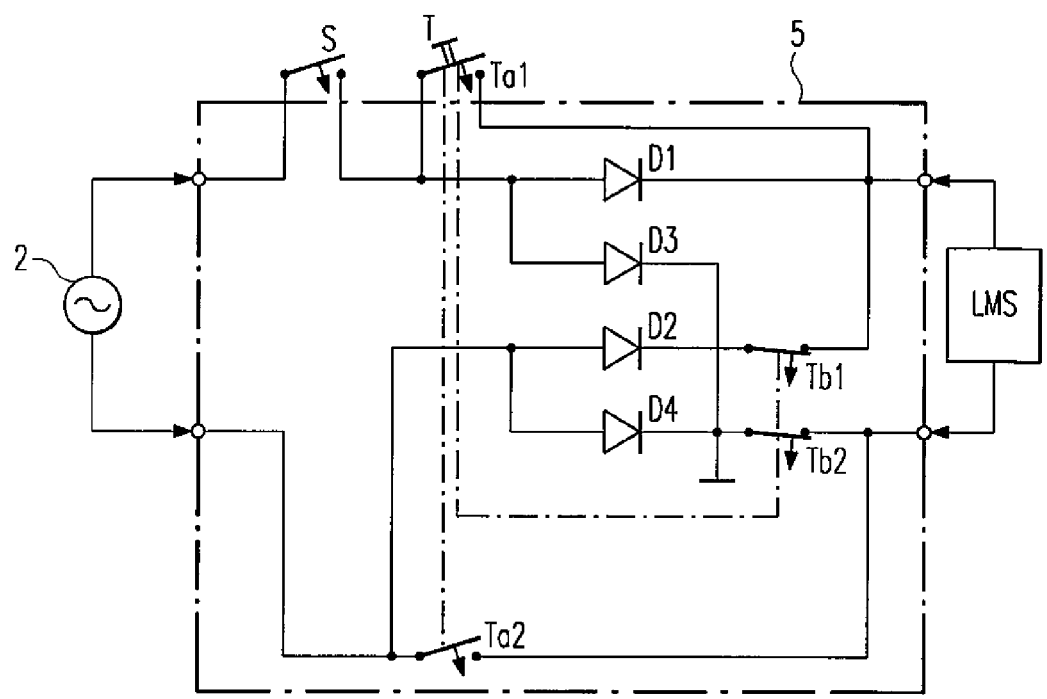
FIG. 5 schematically a control device for an LED illuminant system.

In FIG. 5 shows an embodiment of the control device 5 by way of example. The control device 5 can be connected upstream of a retrofit lamp comprising an LED illuminant system LMS. Here, the mains supply 2 of the LED illuminant system LMS is supplied via the control device 5. The LED illuminant system LMS is supplied with power starting from the mains supply 2. The LED illuminant system LMS is preferably formed by the LED illuminant system LMS, LMS', which can be connected upstream of the rectifier 4.

By preference, the power-supply connections of the retrofit lamp at the same time form the interface with the control device 5, as is the case, for example, with incandescent lamp fittings.

An externally accessible mains switch S and a similarly externally accessible momentary-contact switch T are connected to the control device 5 or integrated within the latter.

The momentary-contact switch T acts, on the one hand, on two contact pairs Ta1/Ta2, and on the other hand Tb1/Tb2, and in fact in opposite directions. This means that in the illustrated resting condition of the momentary-contact switch T, the first contact pair Ta1/Ta2 is open, and the second contact pair Tb1/Tb2 is closed. If the momentary-contact switch T is pressed down against the force of a spring (not illustrated), the first contact pair Ta1/Ta2 is opened, and the second contact pair Tb1/Tb2 is closed.

Furthermore, the control device 5 contains four rectifier diodes D1, D2, D3, D4. These are configured with the two contact pairs Ta1, Ta2 and Tb1, Tb2 in such a manner that, with a closed mains switch S and momentary-contact switch T not depressed, the mains-voltage half waves are supplied to the load L as illustrated in FIG. 6a, that is to say, with alternating polarity.

FIG. 6b shows the case in which, at the time t1, the mains switch S is closed, and the momentary-contact switch T is depressed somewhat later at time t2. At time t3, the switchover procedure is complete.

For the switchover, the contact pairs Ta1/Ta2, on the one hand, and the contact pairs Tb1/Tb2, on the other hand, require a given time, albeit only a short time, in which the mains voltage is interrupted. However, this interruption is so short that it can be buffered away. The illustration of the mains power interruption in FIG. 6b is not to scale and, in the context of the basic principle of functioning of the control device 5 is also of subordinate significance.

At time t4, the momentary-contact switch T is released again. From t3 to t4, mains-power half waves of exclusively the same polarity are then delivered to the load.

After the release of the momentary-contact switch T at time t4, a short interruption of the mains voltage determined by the switchover of the contact pairs Ta1/Ta2, on the one hand, and Tb1/Tb2, on the other hand, is again implemented. From time t5 onwards, at the load, the mains-voltage half waves are again delivered to the load L with the polarity specified by the mains power network N, that is to say, with alternating polarity.

The total length of time $t_{total}$=t4−t3 of the sequence of mains-power half waves with the same polarity specifiable with the momentary-contact switch T determines the degree of the influence or change of a parameter of the load L. In the concrete example, this parameter is the level of dimming or respectively the brightness of the retrofit LED lamp.

It goes without saying that the polarity of the mains-voltage half waves can also be reversed between the times t3 and t4 by reversing the switching arrangement of the rectifier diodes D1 to D4. Accordingly, an additional degree of freedom is available here for the control information to be transmitted, which can be used, for example, to adjust the colour of the lamp to be controlled. A further possibility for the transmission of additional control information is to repeat the sequence of mains-power half waves with the same polarity, and in fact, with a given repetition rate.

It is possible to design the switching arrangement in such a manner that mains-voltage half waves of different, that is, opposing, polarity can be generated. The polarity of the mains-voltage half waves can then be used, for example, to code information.

For example, the dimming direction of a dimming procedure of the light source can be specified by the polarity of a sequence of mains-voltage half waves of the same polarity. Accordingly, for example, successive mains-voltage half waves of a first polarity can cause dimming levels of greater brightness, while successive mains-voltage half waves of a second, reversed polarity cause dimming levels of lesser brightness. The first polarity therefore causes an upward dimming, the second polarity a downward dimming of a dimmable light source.

The upward dimming or respectively downward dimming in this context can be implemented continuously and is continued, for example, for as long as successive mains-voltage half waves of the same polarity are generated. In this context, continuous can mean that, for every specified number of successive mains-voltage half waves of the same polarity, the dimming level is increased or respectively decreased by a minimum possible dimming step. The more mains-voltage half waves of the same polarity follow in succession, the more strongly the upward or downward dimming level is ultimately varied.

A given number of mains-voltage half waves of the same polarity may initially be necessary in order to implement an upward dimming or respectively a downward dimming at all, that is, as a kind of start signal.

More complex coding schemes are also conceivable, wherein-control information is communicated via the number or the concrete sequence of mains-voltage half waves of the same or different polarity. Accordingly, for example, a first specified number of mains-voltage half waves of the same polarity or a first sequence of mains-voltage half waves of alternating priority can activate an upward dimming; a different number or a different sequence can activate a downward dimming.

In particular, abrupt dimming changes can also be coded through a given number or a given sequence of polarities of mains-voltage half waves, or respectively, such an abrupt dimming change can be triggered by these. A specified combination of polarities of mains-voltage half waves could, for example, cause a discontinuous variation of the dimming level by a first specified value. By contrast, a second specified combination of polarities could cause a discontinuous variation of the dimming level by a second specified value. A further possibility for exploiting the different polarities of mains-voltage half waves is to adjust a dimming rate. For example, a first sequence or number of polarities of mains-voltage half waves could specify whether an upward dimming or a downward dimming is to be implemented following this.

After this, for example, mains-voltage half waves of a first polarity could implement a more rapid dimming procedure, mains voltage waves of a second polarity a slower dimming procedure. Furthermore, it is also conceivable to specify a given sequence of polarities of mains-voltage half waves, which varies the dimming rate during a dimming procedure. For example, a specified first sequence could increase the dimming rate by a given percentage or absolute magnitude, a second specified sequence could reduce the dimming rate by a given percentage or absolute magnitude.

Furthermore, it is possible to use complex sequences or patterns of mains-voltage half waves or of polarities of mains-voltage half waves in order to vary or configure different operating parameters from the brightness of a lighting source. One example is the colour or the colour-temperature of the light source. Another example would be an adjustment of whether the light is radiated continuously or in a pulsed manner from the light source. It would also be possible to program an automatic switching off of the light source after a predetermined operating time through the control information communicated in this manner, or to program an automatic switching on, for example, after a predetermined time. The momentary-contact switch T is only an example for a signal generator which can be activated manually (for example, also a switch, rotary dimmer etc.), or which is supplied with non-manual control signals at an interface, or generates the latter itself (for example, a sensor, such as, a daylight sensor, colour sensor etc.).

Instead of a momentary-contact switch, a relay which is triggered, for example, by a momentary-contact switch can also be used.

Figure 6:
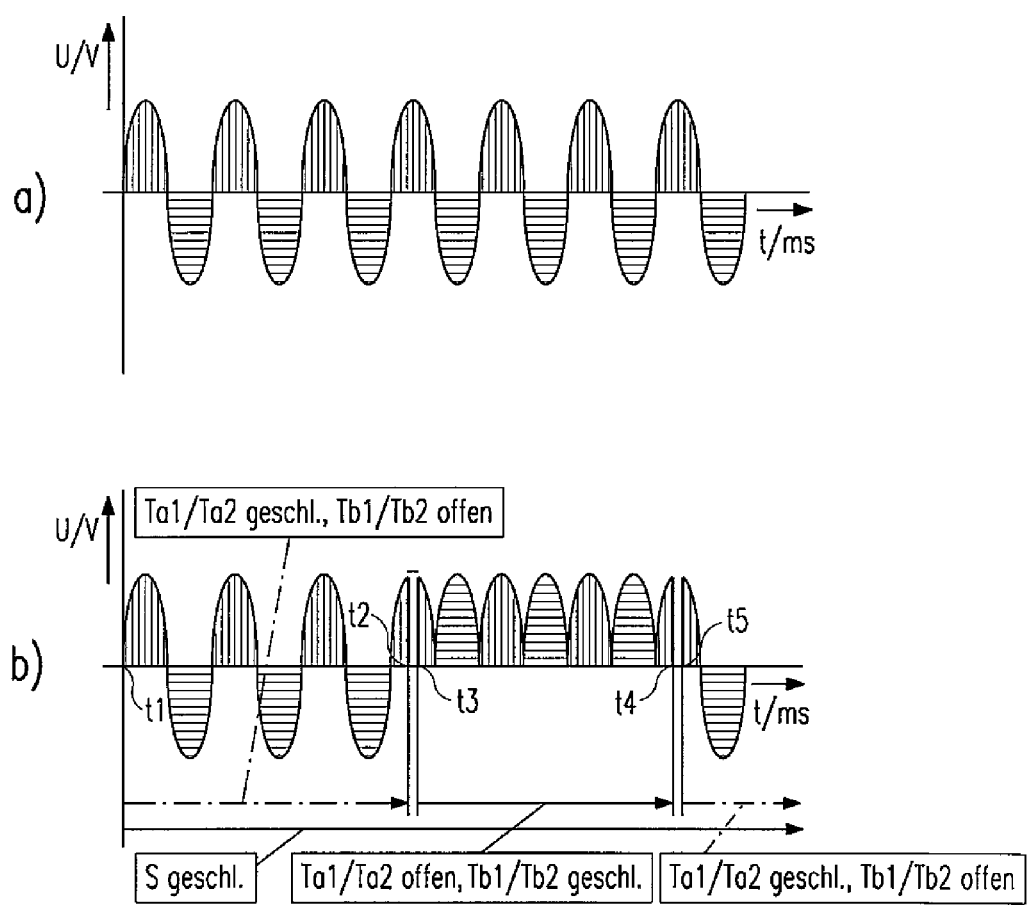
FIG. 6 schematically a selective rectification with the control device from FIG. 5.

The example of FIGS. 5 and 6 is only one possible embodiment of the invention with reference to which it is explained by way of example how the dimming information can be modulated onto the supply and supplied to the illuminant system via the supply.

In an alternative variant or also in a combination, a selective phase-control/reverse phase-control can be used as already explained for the communication of the dimming information via the supply. In this case, for example, the control device 5 can implement a phase-control or a reverse phase-control for a predetermined time, and the time duration or number can be read out as dimming information.

The information (dimming information) coded by the control device 5 is then preferably evaluated by the control unit SE of the LED illuminant system LMS, LMS' and transmitted to the LED illuminant system LMS, LMS'.

The invention claimed is:

1. A dimmable LED illuminant system (LMS, LMS') with at least two parallel and/or back-to-back configured LED illuminant chains (LMK1, LMK2, LMK3) each comprising at least one light emitting diode (L), wherein the LED illuminant system (LMS, LMS') is fed via a supply (V) and comprises a control unit (SE) which is equipped to obtain a dimming information supplied via the supply (V) and to switch on and/or to switch off individual parallel/back-to-back configured LED illuminant chains (LMK1, LMK2, LMK3) in stages dependent upon the dimming information supplied and for the implementation thereof,
   wherein at least one light emitting diode (L) of the LED illuminant system (LMS, LMS') can be bridged by at least one switching element (S) provided parallel to it and switchable by the control unit (SE),
   wherein the control unit (SE) is equipped to activate or to deactivate the switching elements (S), dependent upon an electrical supply (V) of the LED illuminant system (LMS, LMS'),
   wherein the light emitting diodes (L) and the switching elements (S) are arranged in a matrix structure for the bridging,
   wherein, in each LED illuminant row, at least one light emitting diode (L) can be bridged, and in each LED illuminant chain (LMK1, LMK2, LMK3), at least one switching element (S) switchable by the control unit (SE) is provided, which is equipped to switch on or to switch off the respective LED illuminant chain (LMK1, LMK2, LMK3).

2. The dimmable LED illuminant system according to claim 1, wherein the electrical supply (V) of the LED illuminant system (LMS, LMS') is an AC-voltage or a DC-voltage.

3. The dimmable LED illuminant system according to claim 1, wherein a converter (3) is equipped to convert an AC-voltage into a DC-voltage and to deliver the DC-voltage as an electrical supply (V) to the LED illuminant system (LMS, LMS').

4. The dimmable LED illuminant system according to claim 3, wherein the converter (3) is equipped to vary an electrical supply (V) supplied to the LED illuminant system (LMS, LMS') dependent upon a dimming information.

5. The dimmable LED illuminant system according to claim 1, wherein the LED illuminant system (LMS, LMS') comprises back-to-back configured illuminant chains (LMK1, LMK2, LMK3) and can be driven directly starting from an AC-voltage.

6. The dimmable LED illuminant system according to claim 1, wherein the LED illuminant system (LMS, LMS') comprises parallel configured illuminant chains (LMK1, LMK2, LMK3), upstream of which a rectifier (4) is connected, and can be driven directly starting from an AC-voltage.

7. The dimmable LED illuminant system according to claim 1, wherein the control unit (SE) is equipped to switch on or respectively to switch off individual light emitting diodes in the LED illuminant chains (LMK1, LMK2, LMK3) dependent upon the electrical supply (V) of the LED illuminant system (LMS, LMS') by activating or respectively deactivating the switching elements (S) which substantially share one coordinate in their spatial orientation in different LED illuminant chains (LMK1, LMK2, LMK3).

8. The dimmable LED illuminant system according to claim 1, wherein the control unit (SE) is equipped to evaluate a phase-control signal or a reverse phase-control signal and/or a selective half-wave rectification in order to detect the dimming information.

9. The dimmable LED illuminant system according to claim 1, wherein the control unit (SE) is equipped to detect the dimming information by evaluating the electrical supply (V), especially a variation of the electrical supply (V).

10. The dimmable LED illuminant system according to claim 1, wherein, in particular, the electrical supply (V) is a DC-voltage, and the dimming information is an amplitude/amplitude-change of the electrical supply (V).

11. An LED lamp comprising an LED illuminant system (LMS, LMS') according to claim 1.

12. A retrofit lamp comprising an LED illuminant system (LMS, LMS') according to claim 1.

13. An integrated control unit which is embodied for an LED illuminant system (LMS, LMS') according to claim 1.

14. A method for the control of a dimmable LED illuminant system (LMS, LMS') with at least two parallel and/or back-to-back configured LED illuminant chains (LMK1, LMK2, LMK3) each comprising at least one light emitting diode (L), said method comprising the steps of
   feeding the LED illuminant system via a supply (V),
   detecting a dimming information supplied via the supply (V) by a control unit (SE) of the LED illuminant system (LMS, LMS')
   dependent upon the detected dimming information and for the implementation thereof, switching on and/or switching off in stages individual ones of the parallel/back-to-back configured LED illuminant chains (LMK1, LMK2, LMK3)

bridging said at least one light emitting diode (L) of the LED illuminant system (LMS, LMS') by at least one switching element (S) provided parallel to it and switchable by the control unit (SE), activating or deactivating the switching elements (S), dependent upon an electrical supply (V) of the LED illuminant system (LMS, LMS') by the control unit (SE), arranging the light emitting diodes (L) and the switching elements (S) in a matrix structure for the bridging, bridging at least one light emitting diode (L) in each LED illuminant row, and in each LED illuminant chain (LMK1, LMK2, LMK3), providing at least one switching element (5) switchable by the control unit (SE), which is equipped to switch on or to switch off the respective LED illuminant chain (LMK1, LMK2, LMK3).

* * * * *